United States Patent Office 3,412,076
Patented Nov. 19, 1968

3,412,076
RESIN PROVIDING COMPOSITIONS OF POLY-HALOMETHYLATED AROMATIC COMPOUNDS AND HYDROXYALKYL MERCAPTANS
Hugh A. Farber and Richard A. Hickner, Midland, Mich., assignors to The Dow Chemical Company, Midland, Mich., a corporation of Delaware
No Drawing. Original application Oct. 29, 1964, Ser. No. 407,561, now Patent No. 3,338,975, dated Aug. 29, 1967. Divided and this application June 9, 1967, Ser. No. 651,087
4 Claims. (Cl. 260—79)

ABSTRACT OF THE DISCLOSURE

A thermoset resin prepared by heating at about 80 to about 200 C., a composition of matter prepared from the condensation of a polyhalomethyl aromatic compound and a hydroxyalkyl mercaptan. The compositions are useful in the preparation of films, castings and coatings.

---

This is a division of application Ser. No. 407,561, filed Oct. 29, 1964, now Patent 3,338,975 issued Aug. 29, 1967.

The present invention is directed to novel condensation products of certain halomethylated aromatic compounds and hydroxyalkyl mercaptans and in particular is directed to novel condensation products of certain halomethylated aromatic compounds and hydroxyalkyl mercaptans which correspond to the formula:

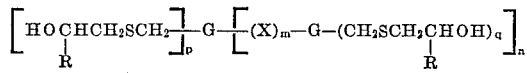

where G represents an aromatic nucleus such as benzene or naphthalene, X is a divalent saturated hydrocarbon group containing 1 to 3 carbon atoms, a sulfur or oxygen atom, R is hydrogen, an alkyl group containing 1 to 4 carbon atoms or hydroxymethyl, $m$ and $n$ are integers from 0 to 1, $p$ and $q$ are integers from 0 to 4, the sum of $p$ and $q$ being at least 2.

The novel compounds are colorless to pale colored oils or crystalline solids. The compounds are very reactive under acid conditions and may be thermally cured under neutral conditions at elevated temperatures e.g. about 80 to about 200° C., to prepare useful films, castings and coatings. The compounds also may be used as the resinous binding ingredient in the production of laminate articles of construction such as bound layers of wood, paper, glass, and the like. The compounds of the present invention find further utility as valuable resin intermediates because of their high functionality and high reactivity. They may be reacted with a variety of polyfunctional compounds such as melamines, polyisocyanates, polycarboxylic acids and polyepoxides to prepare useful thermoset resins.

The novel compounds described herein are most conveniently prepared by reacting a polyhalomethyl aromatic compound having at least two halomethyl groups attached to an aromatic nucleus and having the general formula:

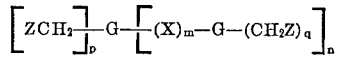

with a hydroxyalkyl mercaptan having the formula:

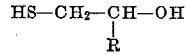

where Z is a halogen atom such as chlorine or bromine and G, R, X, $m$, $n$, $p$ and $q$ are as above defined.

In making the products of the present invention the hydroxyalkyl mercaptan is dissolved along with an essentially stoichiometric amount of an alkali metal hydroxide in an inert diluent such as a lower alkyl alcohol such as methanol, ethanol, or isopropyl alcohol in which the metal halide salt which forms is essentially insoluble. The polyhalomethyl aromatic compound is then added to the reaction vessel over a period of time ranging from about 0.5 to about 4 hours. The reaction which is exothermic is advantageously maintained between 0° and 60° C. by suitable cooling means during the course of the addition of the polyhalomethyl aromatic compound. The relative amounts of the reactants employed are not critical, but when substantially less than stoichiometric quantities of either reactant are employed, there may be unreacted portions of the resulting composition which are susceptible to premature cross-linking and other deleterious effects. Generally, an effective reaction is obtained by employing from about 0.9 to about 1.1 mole of the hydroxyalkyl mercaptan for each available chemical equivalent of halomethyl groups present in the halomethylated aromatic composition.

While an effective amounts of the desired product can be obtained within a few minutes of the initial contacting of the reactants, it is usually desirable to continue the reaction conditions for as much as several hours in order to insure that a substantial proportion of the reactants is converted to the desired product. This is especially true if batch reaction techniques are being employed, but as will be readily apparent to one skilled in the art, continuous processes in which the unreacted ingredients are continuously recovered and recycled to the reaction zone feed streams may utilize comparatively short contact times for effective operation.

Upon achieving a desired degree of conversion of the reactants to the desired product, the reaction mass may be filtered to remove any alkali halides that are formed during the reaction. Subsequently, the filtrate is heated under reduced pressures to distill off the diluent or other volatiles that may be present. The product thus recovered consists essentially of the desired polyhalomethyl aromatic-hydroxyalkyl mercaptan condensation product.

Suitable polyhalomethyl aromatic compounds which may be employed to prepare the compounds of the present invention include, α,α'-dichloro-p-xylene,
α,α'-dibromo-p-xylene,
4,4'-bis(chloromethyl)biphenyl,
4,4'-bis(chloromethyl)bibenzyl,
bis(α-chloro-p-tolyl)methane,
1,3-bis,α-chloro-p-tolyl)propane,
4,4'-bis(bromomethyl)biphenyl,
4,4'-bis(bromomethyl)bibenzyl,
bis(α-bromo-p-tolyl)methane,
1,3-bis(α-bromo-p-tolyl)propane,
2,4'-bis(chloromethyl)diphenyl sulfide,
tris(chloromethyl)diphenyl
and tetrakis (chloromethyl)diphenyl sulfide.

Most advantageously, it is preferable to use a commercial polyhalomethyl diphenyl ether such as described by Doedens and Rosenbock in United States Patents 3,004,072 and 3,047,518. Depending upon reaction conditions and the proportion of halomethylating agent employed, commercial polyhalomethyl diphenyl ethers useful in the preparation of the compounds of the present invention are primarily mixtures of bis-, tris-, and tetrakis-(halomethyl) diphenyl ethers having an average of 1.5 to more than 3.5 halomethyl groups per diphenyl ether molecule. While such product mixture can be separated to provide individual compounds which can be separately utilized in the present invention, the mixtures themselves are good starting materials for the compositions of the present invention. The presence of small amounts of the monohalomethyl diphenyl ether or small amounts of unreacted diphenyl ether in the commercial halomethylation product is in most cases not detrimental.

Suitable hydroxyalkyl mercaptans which may be reacted with the polyhalomethyl aromatic compounds include 2-mercaptoethanol, 1-mercapto-2-propanol, and 1-mercapto-2,3-propanediol.

The following examples further illustrate the invention but are not to be construed as limiting.

Example 1

To a reaction flask equipped with a water condenser, stirrer, thermometer, nitrogen sparging tube and an addition funnel was charged 156 grams (2.0 moles) of 2-mercaptoethanol and 500 ml. isopropyl alcohol. The solution was heated under a nitrogen atmosphere to 50° C. and 80 grams (2.0 mole) NaOH added portionwise. After solution of the caustic was complete, 175 grams (1.0 mole) of α,α'-dichloro-p-xylene was added portionwise over a 3.5 hour period. An additional 500 milliliters of isopropyl alcohol was added to facilitate stirring. After an additional 1.5 hours at 55° C., the mixture was nearly neutral. The salt which precipitated from the solution was filtered off. On cooling, the alcohol solution solidified. Filtration gave 179 grams of product, having a melting point of 90–92° C. Evaporation of the filtrate gave a solid which on recrystallization from methanol weighed 75 grams, M.P. 90–92° C. Total yield was 254 grams (95 percent of theoretical yield). The major portion of the product had the structural formula:

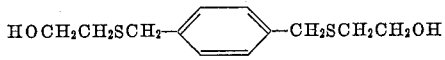

Example 2

The procedure of Example 1 was repeated (under nitrogen) whereby two mole proportions of the sodium salt of 1-mercapto-2,3-propandiol was reacted with one mole proportion of α,α'-dichloro-p-xylene in an isopropyl alcohol diluent. The product, recovered in 83 percent yield, was a very viscous, straw yellow liquid. The major portion of the product had the structural formula:

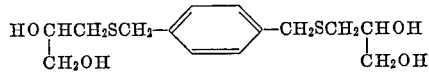

Example 3

The procedure of Example 1 was repeated (under nitrogen) whereby two mole proportions of the sodium salt of 2-mercaptoethanol was reacted with one mole proportion of p,p'-bis(chloromethyl)diphenyl ether in an isopropyl alcohol diluent. The product which crystallized out of alcohol, was washed with water to remove any sodium chloride, and dried in a vacuum oven at room temperature. The product was a white solid recovered in 68 percent yield which had a melting point of 111–113° C. The major portion of the product had the structural formula:

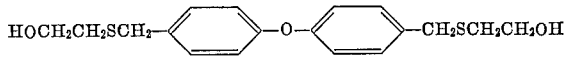

Example 4

Two hundred and ten grams (5.25 moles) of sodium hydroxide was added to 750 cc. of isopropyl alcohol contained in a 3 liter reaction flask equipped with water condenser, stirrer, thermometer, nitrogen sparging tube and an additional funnel. Four hundred and ten grams (5.25 moles) of 2-mercaptoethanol was slowly added to the reaction vessel over a 30 minute period. To this mixture was added slowly, over a 3 hour period under a nitrogen atmosphere 55 grams of CMDPO–32, a commercial mixture of polychloromethylated diphenyl ethers comprised substantially of tris(chloromethyl)diphenyl ether (89 percent), 4,4' - bis(chloromethyl)diphenyl ether (8.6 percent), tetrakis(chloromethyl)diphenyl ether (2.0 percent), and 2,4¹-bis-(chloromethyl)diphenyl ether 1.9 percent) while the temperature of the reaction mixture was maintained below 40° C. with an ice bath. After standing for about 16 hours, the reaction mixture was filtered and devolatilized at 50° C. under reduced pressure and a quantitative yield of a light tan, viscous oil was recovered. Infra-red analysis was used to confirm the nature of the product which had a strong band at 2.9 microns indicating the presence of the expected hydroxyl group. Analysis for chloride ion in the filter cake indicated greater than 90 percent reaction of the reaction components had occurred. The major portion of the product was a mixture of compounds having the formula:

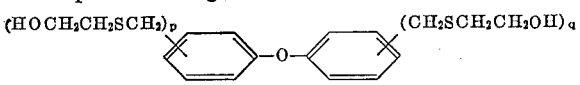

wherein the sum of p and q ranged from 2 to 4.

Five grams of the viscous oil product prepared above was mixed with 4 drops (approximately 0.2 gram) phosphoric acid and spread evenly on the surface of a steel panel and baked at 300° F. The mixture cured to a clear film which adhered firmly to the metal substrate.

Five grams of the viscous oil product prepared above was mixed with 5 drops (approximately 0.25 gram) of an alcohol solution of p-toluenesulfonic acid and spread evenly on one face of each of two 0.25 inch thick plywood panels, and the coated faces were pressed together under 1000 p.s.i. pressure at 150° C. for 10 minutes. The resulting plywood laminate was strongly bonded and exhibited excellent resistance to delamination in water.

The above procedure was also repeated with the exception that no acid was added to the oil. The resulting plywood laminate was strongly bonded and water resistant.

In a manner similar to that employed in the examples described above equivalent amounts of the other polyhalomethyl aromatic compounds mentioned above may be reacted with equivalent amount of other hydroxyalkyl mercaptans to prepared condensation products which are thermally curable to prepare a variety of useful thermoset films, coatings, bonding materials and the like.

What is claimed is:

1. A thermoset resin prepared by heating at about 80 to about 200° C., a composition of matter prepared from the condensation of a polyhalomethyl aromatic compound and a hydroxyalkyl mercaptan, said composition having the formula

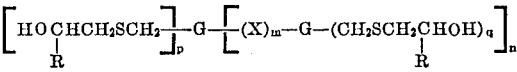

wherein G is an aromatic nucleus selected from the group consisting of benzene and naphthalene, R is selected from the group consisting of hydrogen, saturated hydrocarbon groups containing 1 to 4 carbon atoms and hydroxymethyl, X is selected from the group consisting of oxygen, sulfur, and saturated hydrocarbon groups containing 1 to 3 carbon atoms, $m$ and $n$ are integers from 0 to 1, $p$ and $q$ are integers from 0 to 4, the sum of $p$ and $q$ being at least 2.

2. The resin of claim 1 wherein G is benzene, R is hydrogen, X is oxygen, $m$ and $n$ are 1 and the sum of $p$ and $q$ is 3.

3. The resin of claim 1 wherein G is benzene, R is hydrogen, X is oxygen, m and $n$ are 1 and the sum of $p$ and $q$ is 2.

4. The resin of claim 1 wherein G is benzene, R is hydroxymethyl, $n$ is 0, and $p$ is 2.

References Cited

UNITED STATES PATENTS 3,338,975    8/1967    Farber et al. _____ 260—79

DONALD E. CZAJA, *Primary Examiner.*

M. I. MARQUIS, *Assistant Examiner.*